(12) United States Patent
Lee (10) Patent No.: US 7,609,334 B2
(45) Date of Patent: Oct. 27, 2009

(54) RECEIVING CONTAINER, DISPLAY DEVICE HAVING THE SAME AND A METHOD THEREOF

(75) Inventor: Ik-Soo Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 46 days.

(21) Appl. No.: 11/931,728

(22) Filed: Oct. 31, 2007

(65) Prior Publication Data

US 2008/0158469 A1 Jul. 3, 2008

(30) Foreign Application Priority Data

Dec. 29, 2006 (KR) .............................. 2006-138369

(51) Int. Cl.
*G02F 1/1333* (2006.01)
(52) U.S. Cl. ....................................................... 349/58
(58) Field of Classification Search .................... 349/58
See application file for complete search history.

(56) References Cited

U.S. PATENT DOCUMENTS

2005/0078469 A1* 4/2005 Jeong ........................... 362/31

FOREIGN PATENT DOCUMENTS

| JP | 2006154366 | 6/2006 |
|---|---|---|
| KR | 1020040097092 | 11/2004 |
| KR | 1020050117821 | 12/2005 |

* cited by examiner

*Primary Examiner*—Jerry T Rahll
(74) *Attorney, Agent, or Firm*—Cantor Colburn LLP (57) ABSTRACT

A receiving container includes first to third sidewalls, first and second buffer recesses and a supporting portion. The first sidewall faces shorter first sides of the lower and upper substrates. The second and third sidewalls are connected to end portions of the first sidewall and face each other. The first buffer recesses are disposed in the first and second sidewalls at a region where the first and second sidewalls meet each other, and in the first and third sidewalls where the first and third sidewalls meet each other. The supporting portion is extended from inner surfaces of the first, second and third sidewalls and supports edge portions of the lower substrate. The second buffer recesses are disposed in the supporting portion and at a region of the supporting portion, which corresponds to corners of the lower substrate.

20 Claims, 6 Drawing Sheets

RECEIVING CONTAINER, DISPLAY DEVICE HAVING THE SAME AND A METHOD THEREOF

CROSS-REFERENCE TO RELATED APPLICATIONS

This application claims priority to Korean Patent Application No. 2006-138369, filed on Dec. 29, 2006, and all the benefits accruing therefrom under 35 U.S.C. §119, the contents of which are herein incorporated by reference in its entirety.

BACKGROUND OF THE INVENTION

1. Field of the Invention

The present invention relates to a receiving container and a display device having the receiving container. More particularly, the present invention relates to a receiving container capable of reducing damage to a display panel contained therein and a display device having the receiving container.

2. Description of the Related Art

A liquid crystal display ("LCD") device includes a backlight assembly, for displaying images in a dark environment. A backlight assembly of a small or middle-sized LCD device, such as a cellular phone, a personal digital assistant ("PDA"), etc. typically includes a light-emitting diode ("LED") as a light source, because the LED is relatively light, small and consumes a relatively small amount of energy.

As the mobile device, such as a cellular phone, becomes thinner in thickness and small in size, the LCD panel and the backlight assembly become thinner. For example, glass substrates of about 0.3 millimeter (mm) thickness have replaced conventional glass substrates of about 0.4 mm to about 0.5 mm thickness. However, as the thickness of the glass substrate becomes thinner, the glass substrate is frequently damaged. Particularly, the glass substrate of the LCD panel is frequently broken. In detail, the LCD panel of the mobile display device includes a lower substrate and an upper substrate, and a corner of a side portion of the lower substrate, on which a driver chip is mounted, is frequently damaged.

Therefore, a structure for reducing damage to elements of a small or middle-sized LCD device is required.

BRIEF SUMMARY OF THE INVENTION

An exemplary embodiment provides a receiving container capable of reducing damage to a display panel contained therein.

An exemplary embodiment provides a display device including the receiving container.

In an exemplary embodiment, a receiving container includes a display panel disposed therein. The display panel may include a lower substrate and an upper substrate disposed on the lower substrate. The receiving container may include a first sidewall, a second sidewall, a third sidewall, first buffer recesses, a supporting portion and second buffer recesses. The first sidewall faces a shorter first side of the lower substrate and a shorter first side of the upper substrate. The second and third sidewalls are connected to end portions of the first sidewall and face each other. The first buffer recesses are disposed in the first and second sidewalls at a region where the first and second sidewalls meet each other, and in the first and third sidewalls where the first and third sidewalls meet each other. The supporting portion is extended from an inner surface of the first, second and third sidewalls and support edge portions of the lower substrate. The second buffer recesses are disposed in the supporting portion at a region of the supporting portion which corresponds to corners of the lower substrate.

In an exemplary embodiment, the first buffer recesses face adjacent sides of the lower and upper substrates. The adjacent sides include the first sides. The first buffer recesses may be connected to the second buffer recesses. The second buffer recesses may be extended in a longitudinal direction of the first, second and third sidewalls longer than the first buffer recesses. The lower and upper substrates are separated from base surfaces of the first and second buffer recesses. The first sides of the lower and upper substrates may be separated from each other.

An exemplary embodiment of a display device includes a receiving container, a display panel module and a light-providing module. The receiving container includes a first sidewall, a second sidewall, a third sidewall and first buffer recesses. The second and third sidewalls are connected to end portions of the first sidewall and face each other. The first buffer recesses are disposed in the first and second sidewalls at a region where the first and second sidewalls meet each other, and in the first and third sidewalls where the first and third sidewalls meet each other. The display panel module includes a lower substrate, an upper substrate and a liquid crystal layer. The lower substrate is disposed in the receiving container such that corners of the lower substrate are correspondingly disposed facing the first buffer recesses. The lower substrate includes a first side facing the first sidewall. The upper substrate is combined with the lower substrate. The liquid crystal layer is disposed between the lower and upper substrates. The light-providing module is disposed in the receiving container such that the light-providing module is disposed under the display panel module.

In an exemplary embodiment, the receiving container may further include a supporting portion extended from an inner surface of the first, second and third sidewalls and supporting edge portions of the lower substrate. The supporting portion may include second buffer recesses disposed at regions of the supporting portion on which the first and second sidewalls meet each other and the first and third sidewalls meet each other, respectively. The second buffer recesses may be disposed under the corners of the lower per substrate. The first buffer recesses may be connected to the second buffer recesses. The lower and upper substrates may be separated from base surfaces of the first and second buffer recesses. The first sides of the lower and upper substrates may be separated from each other.

In an exemplary embodiment, the display panel module may further include a driver chip and a panel flexible printed circuit ("FPC"). The driver chip may be disposed on a region of the lower substrate, the region of the lower substrate not being covered by the upper substrate. The panel FPC is connected to the lower substrate at the region of the lower substrate. The first sidewall may have a guide groove through which the panel FPC is outwardly extended from the lower substrate. The light-providing module may include a light-guide plate, a point light source and a power printed circuit board (PCB). The light-guide plate is disposed in the receiving container such that the light-guide plate faces a lower surface of the lower substrate. The light guide plate includes a first side facing the first sidewall. The point light source is disposed between the first side of the light-guide plate and the first sidewall. The point light source may be mounted on the power PCB. The supporting portion may have a light source receiving groove where the point light source is disposed.

An exemplary embodiment provides a method of forming a display device. The method includes forming a receiving frame including a first sidewall, second and third sidewalls connected to end portions of the first sidewall and facing each other, and a supporting portion extending from inner surfaces of the first, second and third sidewalls. First buffer recesses are formed in the first and second sidewalls at a region where the first and second sidewalls meet each other, and in the first and third sidewalls where the first and third sidewalls meet each other. Second buffer recesses are formed in the supporting portion of the receiving frame, the second buffer recesses being disposed at regions of the supporting portion at which the first and second sidewalls meet each other and the first and third sidewalls meet each other, respectively. A display panel module including a lower substrate, an upper substrate combined with the lower substrate, and a liquid crystal layer disposed between the lower and upper substrates, is disposed in the receiving frame such that corners of the lower substrate are correspondingly disposed facing the first buffer recesses, and the supporting portion supports edge portions of the lower substrate. A light-providing module is disposed in the receiving container such that the light-providing module is disposed under the display panel module. The first buffer recesses and second buffer recesses separate side and lower faces of the lower and upper substrates from the receiving frame.

In an exemplary embodiment, when an external impact is applied, the external impact may be applied to both of the lower and upper substrates to prevent damage to the corners.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" other elements or features would then be oriented "upper" relative to the other elements or features. Thus, the term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

In an exemplary embodiment, a receiving container receives a display panel of a mobile display device such as a cellular phone. The display panel may include a lower substrate, an upper substrate, a liquid crystal layer and a driver chip. A longitudinal length of the upper substrate is shorter than a longitudinal length of the lower substrate. Therefore, the upper and lower substrates are combined with each other such that end portions of the upper and lower substrates do not coincide. In other words, the upper and lower substrates are combined with each other such that end portions of the upper and lower substrates are separated from each other. The liquid crystal layer is disposed between the upper and lower substrates. The driver chip is formed on a portion of the lower substrate, the portion being not covered by the upper substrate.

Figure 1:
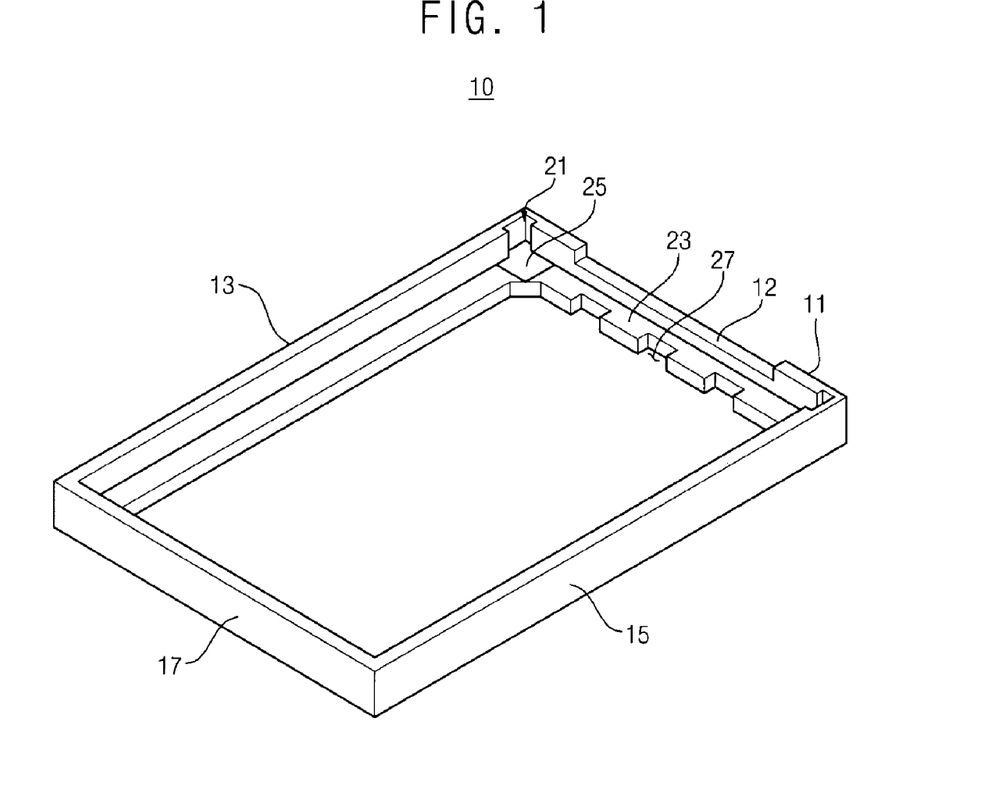
FIG. 1 is perspective view illustrating an exemplary embodiment of a receiving container according to the present invention.
Figure 2:
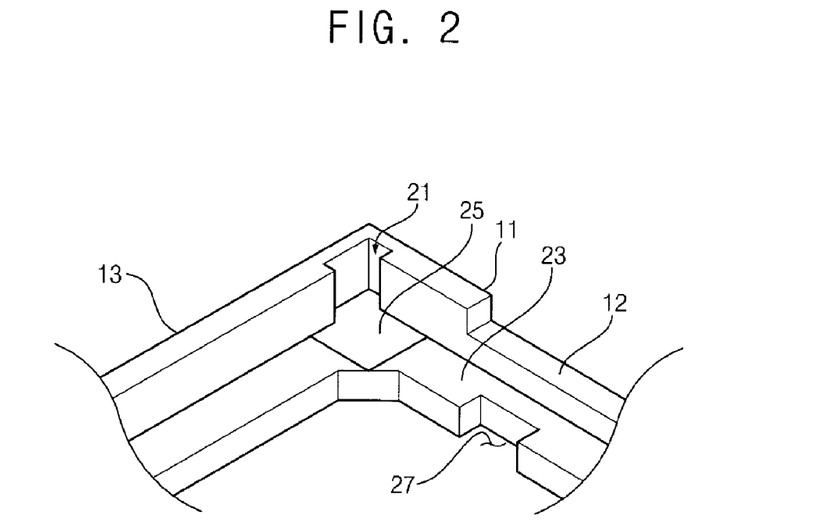
FIG. 2 is an enlarged view illustrating a corner portion of the receiving container in FIG. 1.

FIG. 1 is perspective view illustrating an exemplary embodiment of a receiving container according to the present invention. FIG. 2 is an enlarged view illustrating a corner portion of the receiving container in FIG. 1.

Referring to FIGS. 1 and 2, a receiving container 10 includes a first sidewall 11, a second sidewall 13, a third sidewall 15, a first buffer recess 21, a supporting portion 23 and a second buffer recess 25.

The second and third sidewalls 13 and 15 face each other, and the second and third sidewalls 13 and 15 are connected to first and second end portions of the first sidewall 11, respectively. The receiving container 10 may further include a fourth sidewall 17. The fourth sidewall 17 faces the first sidewall 11, and the fourth sidewall 17 is connected to the second and third sidewalls 13 and 15. The first sidewall 11 may have a guide groove 12. The guide groove 12 is formed on top of (e.g., an upper portion of) the first sidewall 11.

In exemplary embodiments, the receiving container 10 may include any of a number of materials, such as plastic. In an exemplary embodiment, the receiving container 10 may be formed through an injection molding method. The first to fourth sidewalls 11, 13, 15 and 17 are integrally formed. Alternatively, the receiving container 10 may be formed by combining separate pieces. The first to fourth sidewalls 11, 13, 15 and 17 define a receiving space where the display panel is disposed. A backlight assembly providing the display panel with light may also be disposed in the receiving space. As used herein, the term "integrally" is used to indicate formed to be a single unit or piece rather than combining separate elements.

The first buffer recess 21 is formed at a region of the receiving container 10 where the first and second sidewalls 11 and 13 meet each other. The first buffer recess 21 is also formed at a region where the first and third sidewalls 11 and 15 meet each other. The first buffer recess 21 is extended along a longitudinal direction of the first sidewall 11 by a first length, and along a longitudinal direction of the second and third sidewalls 13 and 15 by a second length. In an exemplary embodiment, the second length may be longer than the first length. Alternatively, the first and second lengths may be substantially equal.

The first buffer recess 21 extends from an inner side of the first, second and third sidewalls 11, 13 and 15 toward an outside of the receiving container 10. Inner side surfaces of the first buffer recess 21 are spaced apart from the inner sides of the first, second and third sidewalls 11, 13 and 15 by a predetermined distance. The predetermined distance, which also may be referred to as a depth of the first buffer recess 21, is taken in a direction substantially perpendicular to the first, second and third sidewalls 11, 13 and 15, respectively.

The supporting portion 23 is extended from inner surfaces of the first to fourth sidewalls 11, 13, 15 and 17 to a central portion of the receiving container 10. The supporting portion 23 may have a substantially rectangular frame shape, when viewed on a plane. The receiving container 10, including the central portion being open and the supporting portion 23 being a frame shape, may also be considered a mold frame.

The supporting portion 23 may be extended substantially horizontally from a middle portion of the inner surfaces with respect to a vertical direction of the first to fourth sidewalls 11, 13, 15 and 17 of the receiving container 10. The supporting portion 23 may extend substantially perpendicular to inner surfaces of the first to fourth sidewalls 11, 13, 15 and 17. The supporting portion 23 supports edge portions of the lower substrate (not shown).

The supporting portion 23 protruded from the inner surface of the first sidewall 11 may further have a light source receiving groove 27. The light source receiving groove 27 is extended inward from an edge of the supporting portion 23 towards the first sidewall 11. The light source receiving groove 27 forms a recess in the supporting portion 23 which extends a partial distance from the edge of the supporting portion 23 toward the first sidewall 11. Three of the light source receiving groove 27 is illustrated in the exemplary embodiment, but the invention is not limited thereto. The edge of the supporting member 23 may also include an inclined portion (e.g., taken relative to the first sidewall 11 when viewed on a plane) corresponding to a position of the second buffer recess 25.

As in the illustrated embodiment, the supporting portion 23 includes the second buffer recess 25. The second buffer recess 25 is formed at a region of the supporting portion 23 corresponding to end portions of the first sidewall 11. The second buffer recess 25 may be extended longer than the first buffer recess 21 along a longitudinal direction of the first, second and third sidewalls 11, 13 and 15.

The second buffer recess 25 extends from an upper surface of the supporting portion 23 toward a bottom side of the receiving container 10 (e.g., downwards). A lower surface of the first buffer recess 21 is spaced apart from the upper surface of the supporting portion 23 by a predetermined distance. The predetermined distance, which also may be referred to as a depth of the second buffer recess 25, is taken in a direction substantially perpendicular to the upper surface of the supporting portion 23.

The second buffer recess 25 may extend along the supporting portion 23 by a predetermined length. However, two second buffer recesses 25 respectively disposed at two corners does not meet each other.

The first buffer recess 21 faces upward (e.g., in a vertical direction) and is connected to the second buffer recess 25. Depths of the first buffer recess 21 and of the second buffer recess 25 form a space or gap.

Figure 3:
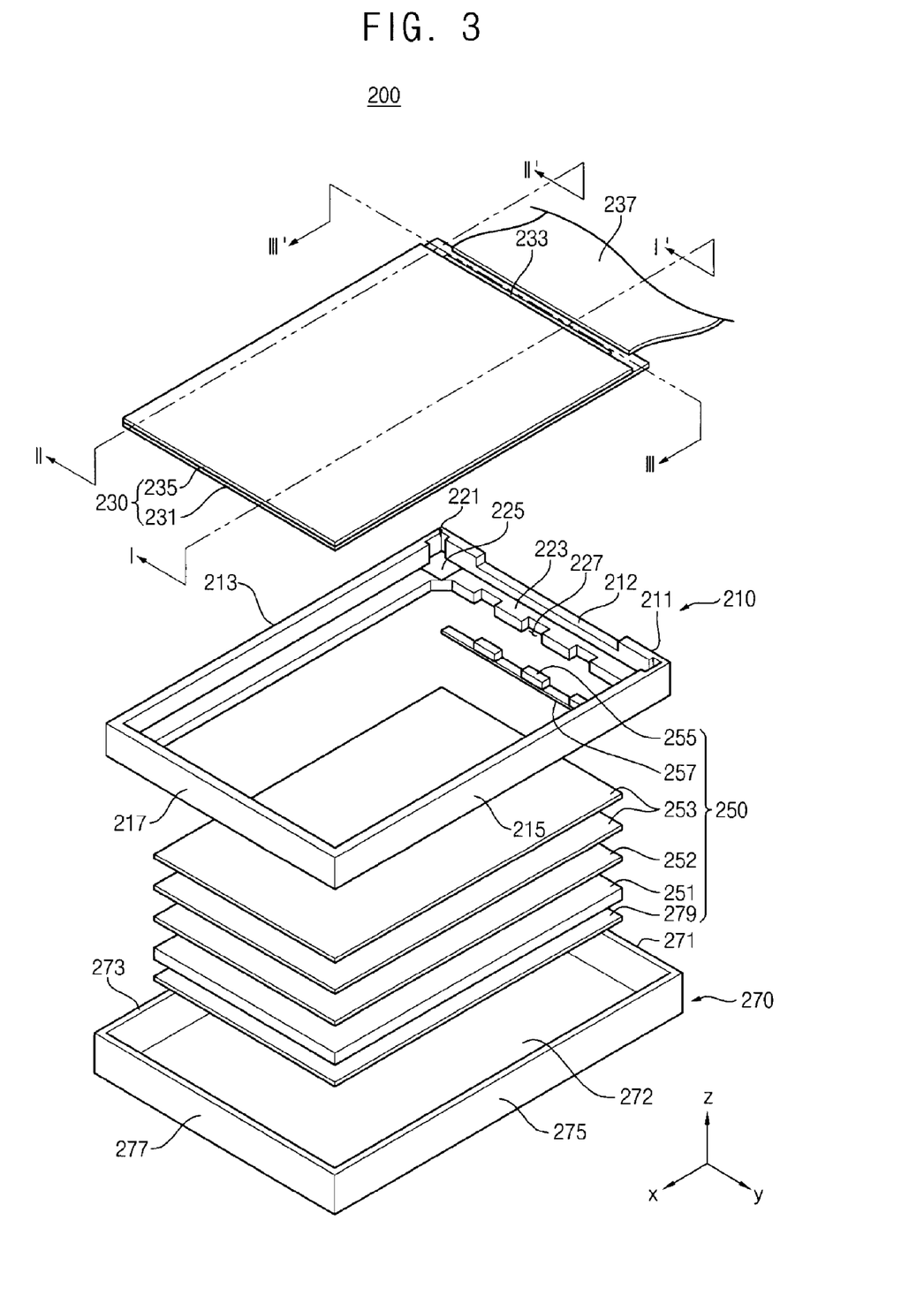
FIG. 3 is an exploded perspective view illustrating an exemplary embodiment of a display device according to the present invention.

FIG. 3 is an exploded perspective view illustrating an exemplary embodiment of a display device according to the present invention.

Referring to FIG. 3, a display device 200 includes a receiving container 210, a display panel module 230 and a light-providing module 250.

The receiving container 210 may be substantially the same as the receiving container 10 in FIGS. 1 and 2. In an exemplary embodiment as illustrated in FIG. 3, the receiving container 210 may be substantially frame shaped. For orientation purposes, a Cartesian coordinate system may be used where a first (e.g., transverse) side of the receiving extends along a Y-axis direction, and a second side (e.g., longitudinal) of the display device extends along an X-axis direction, where the Y-axis is substantially perpendicular to the X-axis and a Z-axis direction is substantially perpendicular to both the X and Y axes. The Z-axis may be considered as extending in an up-down or vertical direction, whereas the X-axis and Y-axis may be considered as extending in a horizontal direction, such as when viewed on a plane.

The receiving container 210 includes a first sidewall 211, a second sidewall 213, a third sidewall 215, a fourth sidewall 217, a first buffer recess 221, a supporting portion 223 and a second buffer recess 225. The first sidewall 211 may have a guide groove 212. The guide groove 212 is formed on top of (e.g., an upper portion of) the first sidewall 211.

The display panel module 230 includes a lower substrate 231, an upper substrate 235 and a liquid crystal layer (not shown) disposed between the lower and upper substrates 231 and 235.

In an exemplary embodiment, the lower substrate 231 may include a lower base substrate, gate lines, data lines and pixel parts.

As in the illustrated embodiment, the lower substrate 231 may have substantially a rectangular shape including a long side (e.g., longitudinal) and a short (e.g., transverse) side. In one exemplary embodiment, the lower substrate 231 may include glass that is optically isotropic. The gate lines may be extended along the long side of the lower base substrate and the data lines may be extended along the short side of the lower baser substrate. In an exemplary embodiment, the pixel parts may be defined by the gate lines and the data lines. Each of the pixel parts includes a switching device and a pixel electrode. The switching device is electrically connected to one of the data lines, one of the gate lines, and the pixel electrode. The switching device controls pixel voltage applied to the pixel electrode.

The upper substrate 235 may include an upper base substrate, color filters and a common electrode.

The upper base substrate of the upper substrate 235 may include the same material as the lower base substrate of the lower substrate 231. In one exemplary embodiment, the upper base substrate includes glass. The upper substrate 235 has a short side having substantially the same length as the short side of the lower base substrate, and a long side having shorter length than the long side of the lower substrate 231. Alternatively, the long side of the upper substrate 235 may have the same length as the long side of the lower substrate 231 such that end portions of the upper and lower substrates 235 and 231 substantially coincide with each other.

As illustrated in the exemplary embodiment of FIG. 3, the upper substrate 235 is combined with the lower substrate 231 such that a portion of the lower substrate 231 is not covered by the upper substrate 235. The color filters are formed on the upper base substrate of the upper substrate 235 such that the color filters of the upper substrate 235 correspond to the pixel parts of the lower substrate 231. The common electrode covers the color filters and face the pixel electrode.

A region where the lower and upper substrates 231 and 235 overlap with each other, is defined as a display region, and the region where the lower substrate 231 is not covered by the upper substrate 235 is defined as peripheral region.

The liquid crystal layer is disposed between the lower and upper substrates 231 and 235.

Figure 4:
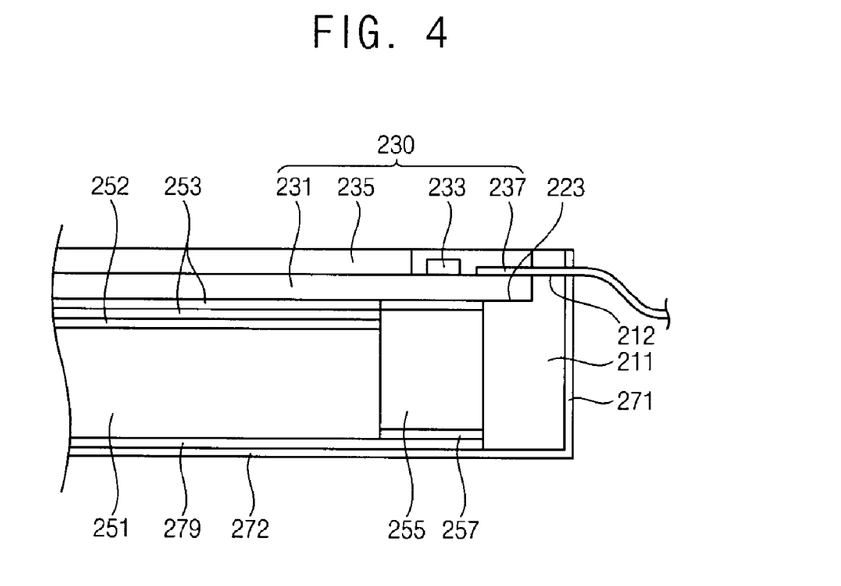
FIG. 4 is a cross-sectional view taken along line I-I' in FIG. 3.

FIG. 4 is a cross-sectional view taken along line I-I' in FIG. 3.

Referring to FIGS. 3 and 4, the display panel module 230 may further include a driver chip 233 and a panel flexible printed circuit ("FPC") 237.

The driver chip 233 is mounted on a peripheral region of the lower substrate 231, such as on the portion of the lower substrate 231 not covered by the upper substrate 235. The panel FPC 237 is connected to the peripheral region of the lower substrate 231, and electrically connected to the driver chip 233. When the driver chip 233 receives a panel driving signal from an external device (not shown), the driver chip 233 applies a data signal and a gate signal to the switching device of the pixel parts on the lower substrate 231.

The display panel module 230 is disposed in the receiving container 210 such that the short side of the lower substrate 231 is adjacent to the first sidewall 211 of the receiving container 210. The transverse side of the lower substrate 231 where the driver chip 233 and the panel FPC 237 are connected may correspond to the first sidewall 11, as illustrated in FIG. 3.

The supporting portion 223 of the receiving container 210 supports an end portion of the lower substrate 231 at which the driver chip 233 and the panel FPC 237 are connected. An edge of a first short side of the lower substrate 231, which is adjacent to the driver chip 233, may make contact with the inner surface of the first sidewall 211 of the receiving container 210. Edges of first and second long sides of the lower substrate 231 may make contact with inner surfaces of the second and third sidewalls 213 and 215 of the receiving container 210, respectively. An edge of a second short side of the lower substrate 231, which is opposite to the first short side, may make contact with the fourth sidewall 217 of the receiving container 210.

The supporting portion 223 has a thickness that is greater than a height of a point light source 255, so that the point light source is separated from the lower substrate 231, when the point light source 255 is inserted into a light source receiving groove 227 in FIG. 3. When the point light source 255 makes contact with the lower substrate 231, heat generated by the point light source 255 is transferred to the lower substrate 231.

The panel FPC 237 is extended from the peripheral portion of the lower substrate 231 towards an outside of the display device 200 and along the guide groove 212 formed on the top of the first sidewall 211. A length of the guide groove 212 in the transverse direction of the receiving container 210 may be configured to accommodate a width (e.g., taken along the transverse direction) of the panel FPC 237.

Figure 5:
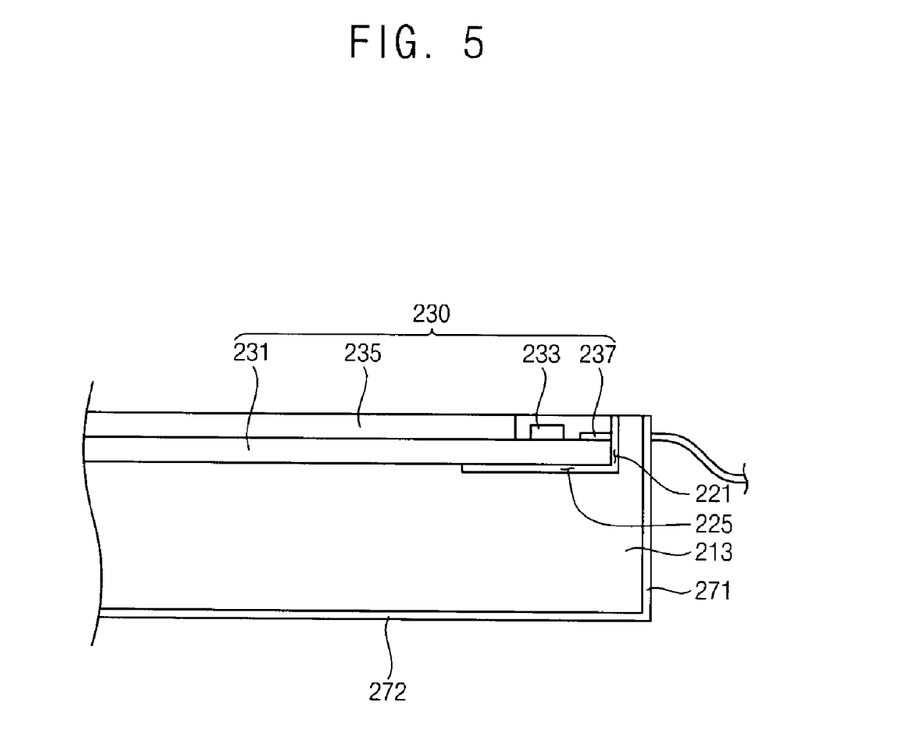
FIG. 5 is a cross-sectional view taken along line II-II' in FIG. 3.
Figure 6:
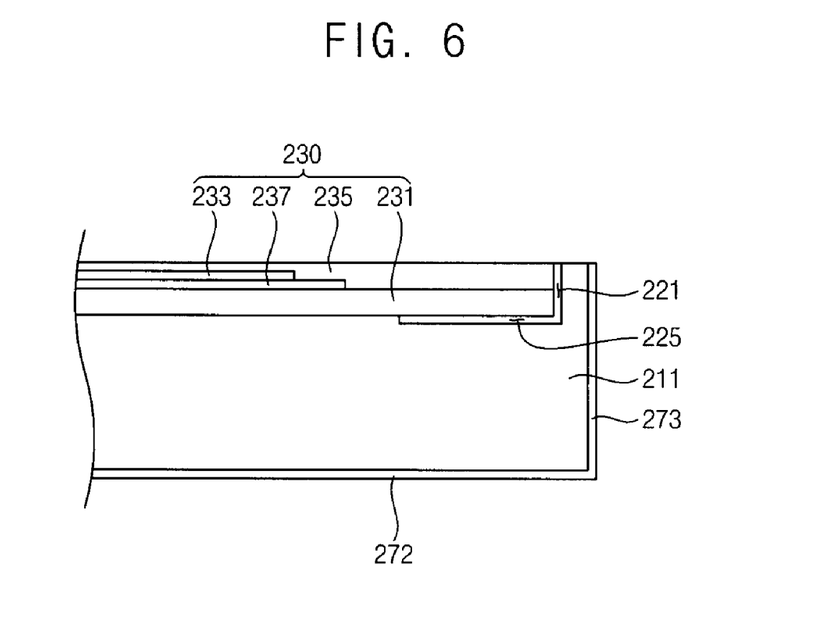
FIG. 6 is a cross-sectional view taken along line III-III' in FIG. 3.
Figure 7:
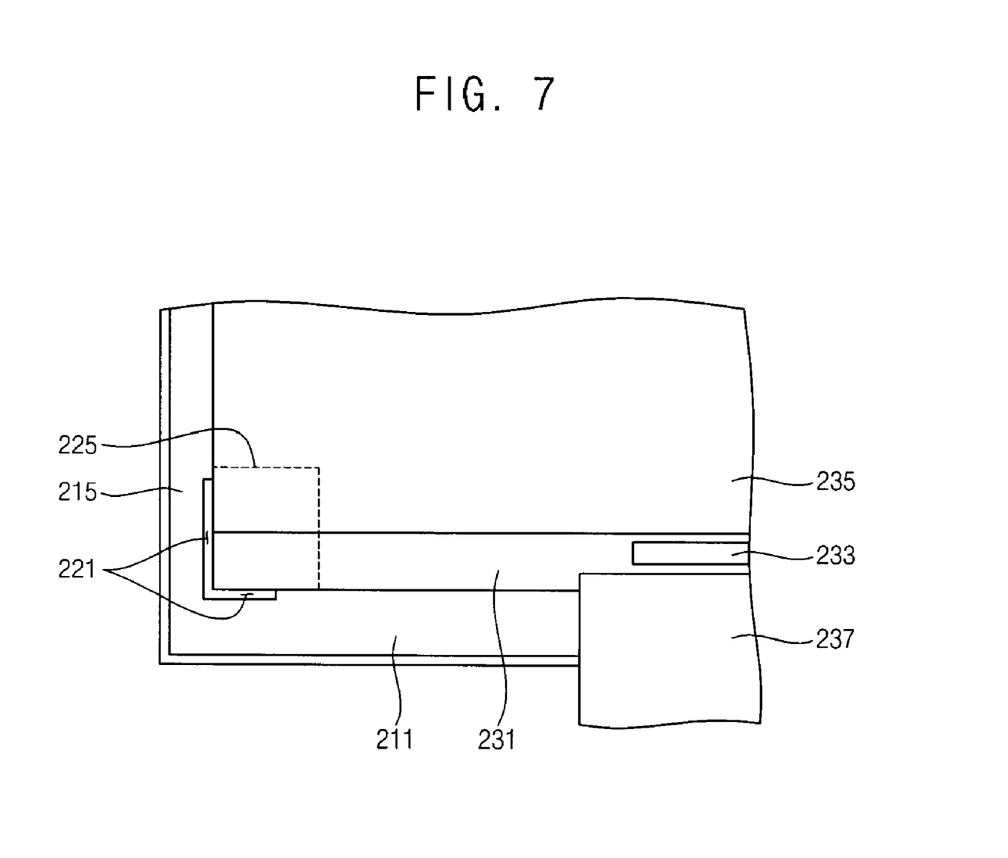
FIG. 7 is a plan view illustrating the display device in FIG. 3.

FIG. 5 is a cross-sectional view taken along line II-II' in FIG. 3. FIG. 6 is a cross-sectional view taken along line III-III' in FIG. 3. FIG. 7 is a plan view illustrating the display device in FIG. 3.

Referring to FIGS. 5, 6 and 7, the lower substrate 231 is received in the receiving container 210 such that a corner of the first short side of the lower substrate 231 corresponds to first and second buffer recesses 221 and 225.

The second buffer recess 225 is formed corresponding to a face (e.g., lower face) of the corner of the lower substrate 231 and upper substrate 235, where the first short side of the lower substrate 231 meets the first or second long side, as shown in FIGS. 5 and 7.

The first buffer recess 221 is formed corresponding to edges of the corner of the lower substrate 231 and upper substrate 235, as shown in FIGS. 5, 6 and 7.

Corner portions of the lower and upper substrates 231 and 235 are separated from base surfaces of the first and second buffer recesses 221 and 225 along the x, y and z-axis directions. That is, a portion of the lower surface of the lower substrate 231 is spaced apart from a lower surface of the second buffer recess 225, and portions of edges of the lower and upper substrates 231 and 235 (e.g., at a corner corresponding to the second buffer recess 225) are spaced apart from inner side (e.g., vertical) surfaces of the first buffer recess 221. Remaining portions of the edges of the lower and upper substrates 231 and 235 make contact with the inner faces of the first, second, third and fourth sidewalls 211, 213, 215 and 217 of the receiving container 210. The supporting portion 223 makes contact with the lower substrate 231 to support the substrate 231.

The x-axis direction is substantially parallel with a longitudinal direction of the second and third sidewalls 213 and 215 of the receiving container 210. The y-axis direction is substantially parallel with a longitudinal direction of the first and fourth sidewalls 211 and 217 of the receiving container 210. The z-axis direction is substantially parallel with a normal line of the lower and upper substrates 231 and 235.

When an external impact is applied to the receiving container 210 along any direction that can be represented by the X, Y and Z direction, the impact may be applied to both of the lower and upper substrates 231 and 235 so that the impact is dispersed to both of the lower and upper substrates 231 and 235. Advantageously, damage to the corner of the peripheral region of the lower substrate 231 may be reduced or effectively, because the corner of the peripheral region of the lower substrate 231 not covered by the upper substrate 235 is spaced apart from the first, second and third sidewalls 211, 213 and 215 of the receiving container 210.

Referring again to FIGS. 3 and 4, the light-providing module 250 includes a power printed circuit board ("PCB") 257, the point light source 255, a light-guide plate 251, a diffusion sheet 252 and light-condensing sheets 253. The power PCB 257 is disposed under the supporting portion 223 adjacent to the first sidewall 211. The point light source 255 is mounted on the power PCB 257, and inserted into the light source receiving groove 227. Alternatively, the power PCB 257 may be disposed on the supporting portion 223. The power PCB 257 provides the point light source 255 with electrical power.

The light-guide plate 251 guides light provided by the point light source 255. The light-guide plate 251 may have four side surfaces (e.g. edges) respectively facing the first, second, third and fourth sidewalls 211, 213, 215 and 217 of the receiving container 210, a light-exiting surface (e.g., an upper surface facing the diffusion sheet 252) and an opposite surface (e.g., a lower surface facing the bottom plate 272 of the receptacle 270). The light-exiting surface faces the lower substrate 231. The opposite surface is opposite to the light-exiting surface. The light-guide plate 251 may be disposed such that a side surface of the light guide plate 251 faces a side surface (e.g. edge face) of the supporting portion 223. The point light source 255 emits light toward the side surface of the supporting portion 223.

Alternatively, the light-guide plate 251 may be disposed such that an edge portion of the light-exiting surface is disposed under the supporting portion 223. When the light-guide plate 251 is disposed such that the edge portion of the light-exiting surface is disposed under the supporting portion 223, the point light source 255 may be partially inserted into the light source receiving groove 227 or the light source receiving groove 227 may be optional, and the point light source 255 may be disposed between the side surface of the light-guide plate 251 and the first sidewall 211.

As illustrated in FIGS. 3 and 4, the diffusion sheet 252 is disposed over the light-exiting surface of the light guide plate 251, and the light-condensing sheets 253 are disposed on the diffusion sheet 252. The diffusion sheet 252 enhances luminance uniformity of light exiting from the light-exiting surface of the light-guide plate 251. The light-condensing sheets 253 enhance front-view luminance of light exiting from the diffusion sheet 252 to provide the lower substrate 231 with the light having enhanced front-view luminance.

The light-providing module 250 may further include a reflective sheet 279 disposed under the opposite surface of the light-guide plate 251.

Referring again to FIG. 3, the display device 200 may further include a receptacle 270.

The receptacle 270 may have a bottom plate 272, a first sidewall portion 271, a second sidewall portion 273, a third sidewall portion 275 and a fourth sidewall portion 277. The bottom plate 272 faces the reflective sheet 279, and supports the light-guide plate 251. Alternatively, the bottom plate 272 may have a reflective layer that substitutes for the reflective sheet 279. The first, second, third and fourth sidewall portions 271, 273, 275 and 277 are upwardly extended from the bottom plate 272 such that inner surfaces of the sidewall portions 271, 273, 275 and 277 cover outer sides of the first, second, third and fourth sidewalls 211, 213, 215 and 217 of the receiving container 210, respectively. In another exemplary embodiment, a top chassis or frame (not shown) may be disposed to cover both the receiving container and the receptacle 270. For example, inner sides of sidewalls of the top chassis may face and/or contact outer surfaces of sidewalls of the receiving container 210 and/or the receptacle 270.

Figure 8:
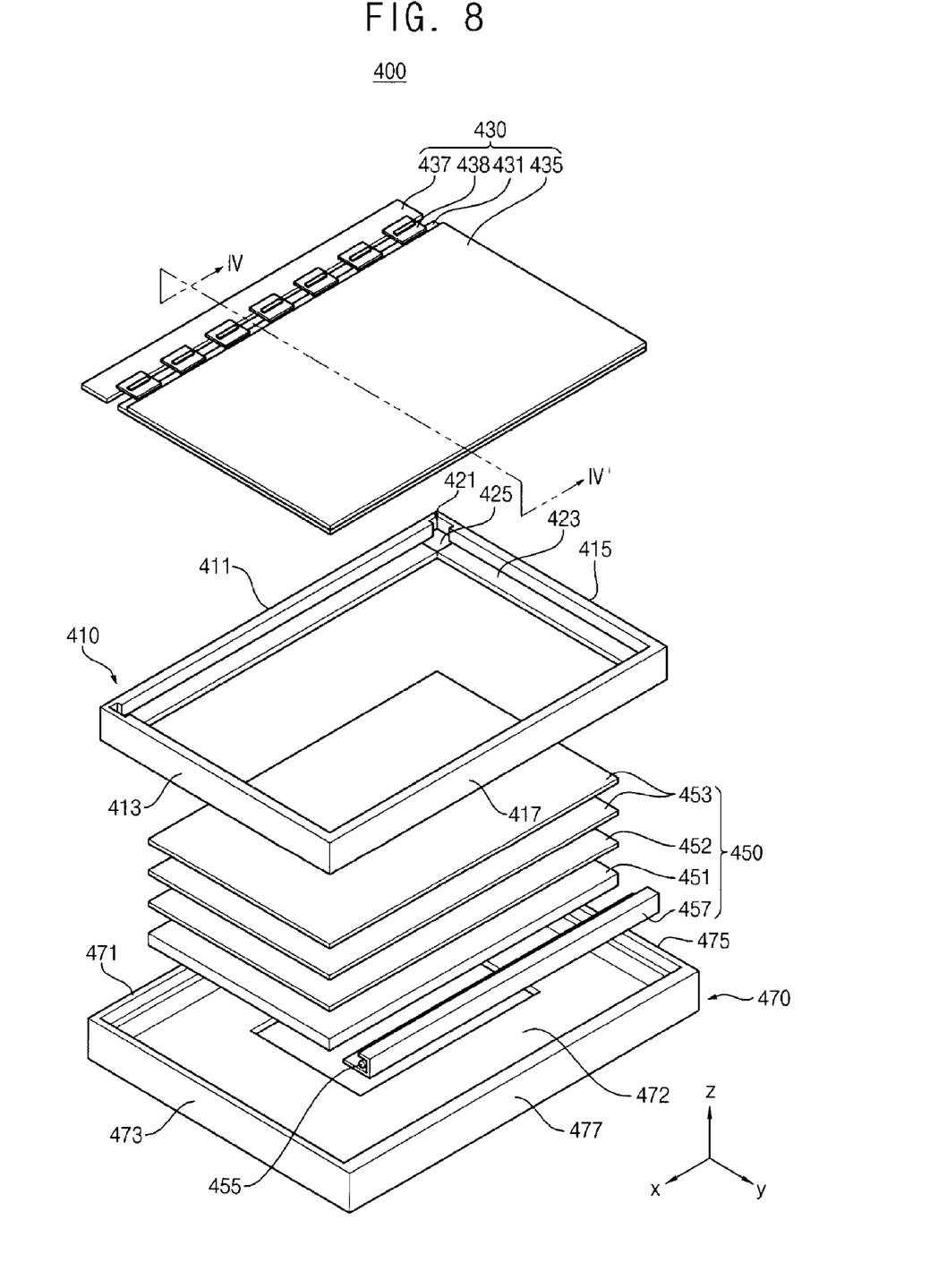
FIG. 8 is an exploded perspective view illustrating another exemplary embodiment of a display device according to the present invention.
Figure 9:
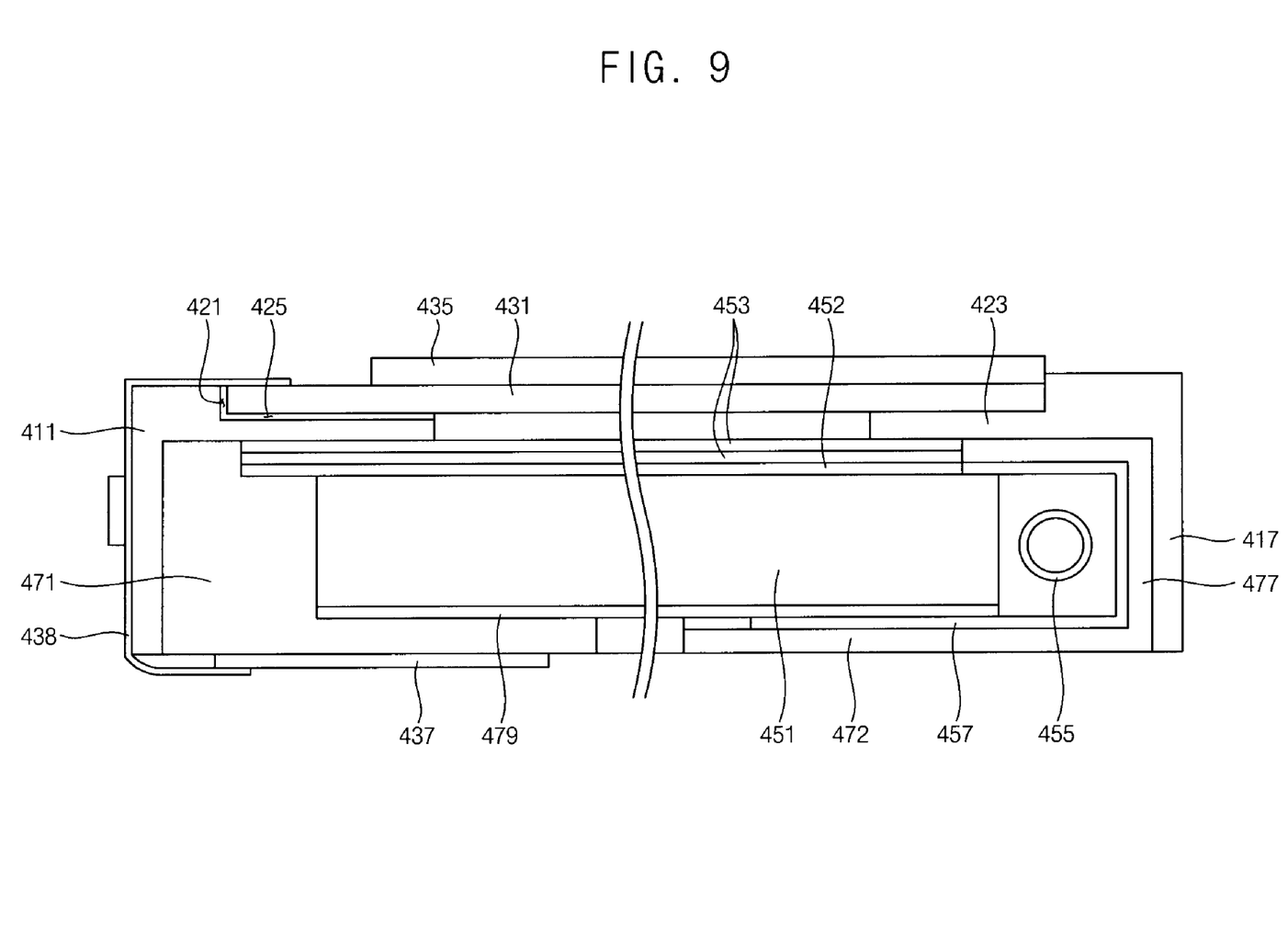
FIG. 9 is a cross-sectional view taken along line IV-IV' in FIG. 8.

FIG. 8 is an exploded perspective view illustrating another exemplary embodiment of a display device according to the present invention, and FIG. 9 is a cross-sectional view taken along line IV-IV' in FIG. 8.

Referring to FIGS. 8 and 9, a display device 400 includes a receiving container or (upper frame) 410, a display panel module 430, a light-providing module 450 and a receptacle (or lower frame) 470. In exemplary embodiments, the display device 400 may be employed by electronic devices, such as a notebook computer.

The receiving container 410 includes a first sidewall 411, a second sidewall 413, a third sidewall 415, a fourth sidewall 417, a first buffer recess 421, a supporting portion 423 and a second buffer recess 425.

The receiving container 410 in FIGS. 8 and 9 is substantially the same as the receiving container 210 in FIG. 3 except that the receiving container 410 in FIGS. 8 and 9 does not have the light source receiving groove 227 in FIG. 3.

The supporting portion 423 protrudes from inner surfaces of the first, second, third and fourth sidewalls 411, 413, 415, and 417, and towards a center part of the upper frame 410. The supporting portion 423 divides a receiving space defined by the first, second, third and fourth sidewalls 411, 413, 415, and 417 into an upper space and a lower space, since the supporting portion 423 is extended from the sidewalls 411, 413, 415 and 417 at a mid-portion of a vertical height of the sidewalls 411, 413, 415 and 417.

The display panel module 430 includes a lower substrate 431, an upper substrate 435, a liquid crystal layer (not shown), a driving PCB 437 and an FPC 438. The lower substrate 431, the upper substrate 435 and the liquid crystal layer may be substantially the same as the lower substrate 231, the upper substrate 235 and the liquid crystal layer in the embodiment illustrated in FIG. 3. For example, the short side of the upper substrate 435 is shorter than the short side of the lower substrate 431, so that a long side of the upper substrate 435 does not coincide with a long side of the lower substrate 431. A portion of the lower substrate 431 is not overlapped with or covered by the upper substrate 435. The driving PCB 437 and the FPC 438 are disposed at this uncovered portion of the lower substrate 431.

A lower surface of a periphery of the lower substrate 431 is disposed on the supporting portion 423 of the receiving container 410. The long side of the lower substrate 431 is adjacent to the first sidewall 411. Corners at ends of the long side of the lower substrate 431, the long side being adjacent to the first sidewall 411, are disposed to correspond to the first and second buffer recesses 421 and 425.

The first buffer recess 421 is formed adjacent to the corners of the long side of the lower substrate 431, and corners of the long side of the upper substrate 435.

The second buffer recess 425 is formed under the corners of the long side of the lower substrate 431, and corners of the long side of the upper substrate 435. Therefore, the lower substrate 431 and the upper substrate 425 are spaced apart from the base surface of the first and second buffer recesses 421 and 425 along x, y and z-axis directions. The base surface of the first buffer recess 421 may also be referred to as a vertical side face of the first buffer recess 421, and the base surface of the second buffer recess 425 may be referred to as a horizontal bottom surface of the second buffer recess 425.

The driver PCB 437 outputs a panel driving signal. The FPC 438 connects the driver PCB 437 to the long side of the lower substrate 431.

The receptacle 470 may be substantially the same as the receptacle 270 in FIG. 3 except that the receptacle 470 includes a bottom plate having an opening, and first, second, third and fourth sidewall portions 471, 473, 475 and 477 having stepped portions, respectively. The first, second, third and fourth sidewall portions 471, 473, 475 and 477 of the receptacle 470 respectively face the first, second, third and fourth sidewalls 411, 413, 415 and 417 of the receiving container 410.

The light-providing module 450 includes a light-guide plate 451, a diffusion sheet 452, light-condensing sheets 453, a lamp 455, a lamp cover 457 and a reflective sheet 479.

The light-guide plate 451, the diffusion sheet 452, the light-condensing sheets 453 and the reflective sheet 479 may be substantially the same as those in FIGS. 3 and 4.

The light-guide plate 451 is disposed in the lower (e.g., receiving) space defined by the bottom plate 472, the first, second, third and fourth sidewalls 411, 413, 415 and 417 and the supporting portion 423. Therefore, the light-guide plate 451 is disposed such that a portion of the light-exiting surface faces the supporting portion 423.

The diffusion sheet 452 and the light-condensing sheets 453 are disposed over the light-exiting surface of the light-guide plate 451. The diffusion sheet 452 and the light-condensing sheets 453 may be supported by the stepped portion of the first, second, third and fourth sidewall portions 471, 473, 475 and 477 of the receptacle 470.

The lamp 455 is disposed between the inner surface of the fourth sidewall 417 of the receiving container 410 and a side (e.g., incident) surface of the light-guide plate 451. The lamp cover 457 covers the lamp 455 such that light generated by the lamp 455 may enter the light-guide plate 451 through the incident surface.

The FPC 438 is bent along an outer surface of the first sidewall 411 such that the driving PCB 437 is disposed under (e.g., at a lower surface) the bottom plate 472 of the receptacle 470.

According to the present invention, a lower substrate is disposed such that corners of the lower substrate are disposed adjacent to and over buffer recesses. In other words, the lower substrate and an upper substrate are separated from a base surface of the buffer recesses. Therefore, when an external impact is applied, the external impact may be applied to both of the lower and upper substrates to prevent damage to the corners.

Having described the exemplary embodiments of the present invention and its advantages, it is noted that various changes, substitutions and alterations can be made herein without departing from the spirit and scope of the invention as defined by appended claims.

What is claimed is:

1. A receiving container receiving a display panel including a lower substrate and an upper substrate disposed on the lower substrate, the receiving container comprising:
   a first sidewall facing a first side of the lower substrate and a first side of the upper substrate;
   second and third sidewalls connected to end portions of the first sidewall and facing each other;
   first buffer recesses disposed in the first, and second sidewalls at a region where the first and second sidewalls meet each other, and in the first and third sidewalls where the first and third sidewalls meet each other;
   a supporting portion extended from inner surfaces of the first, second and third sidewalls, and supporting edge portions of the lower substrate; and
   second buffer recesses disposed in the supporting portion and at a region of the supporting portion corresponding to corners of the lower substrate where the first buffer recesses are respectively disposed.

2. The receiving container of claim 1, wherein the first buffer recesses face adjacent sides of corners of the lower and upper substrates, the adjacent sides including the first sides.

3. The receiving container of claim 2, wherein the first buffer recesses are connected to the second buffer recesses.

4. The receiving container of claim 3, wherein the second buffer recesses are extended in a longitudinal direction of the first, second and third sidewalls longer than the first buffer recesses.

5. The receiving container of claim 4, wherein the lower and upper substrates are separated from base surfaces of the first and second buffer recesses.

6. The receiving container of claim 1, wherein the first sides of the lower and upper substrates are separated from each other.

7. A display device comprising:
   a receiving container comprising:
      a first sidewall;
      second and third sidewalls connected to end portions of the first sidewall and facing each other;
      first buffer recesses disposed in the first and second sidewalls at a region where the first and second sidewalls meet each other, and in the first and third sidewalls where the first and third sidewalls meet each other; and
a supporting portion extended from inner surfaces of the first, second and third sidewalls, and supporting edge portions of the lower substrate, the supporting portion including second buffer recesses disposed at regions of the supporting portion at which the first and second sidewalls meet each other and the first and third sidewalls meet each other, respectively;
a display panel module comprising:
a lower substrate disposed in the receiving container such that corners of the lower substrate are correspondingly disposed facing the first buffer recesses, the lower substrate including a first side facing the first sidewall;
an upper substrate combined with the lower substrate and including a first side facing the first sidewall; and
a liquid crystal layer disposed between the lower and upper substrates; and
a light-providing module disposed in the receiving container such that the light-providing module is disposed under the display panel module.

8. The display device of claim 7, wherein the second buffer recesses are disposed under the corners of the lower substrate.

9. The display device of claim 8, wherein the first buffer recesses are connected to the second buffer recesses.

10. The display device of claim 9, wherein the lower and upper substrates are separated from base surfaces of the first and second buffer recesses.

11. The display device of claim 7, wherein the first sides of the lower and upper substrates are separated from each other.

12. The display device of claim 11, wherein the display panel module further comprises:
a driver chip disposed on a region of the lower substrate, the region of the lower substrate not being covered by the upper substrate; and
a panel flexible printed circuit ("FPC") connected at the region to the lower substrate.

13. The display device of claim 12, wherein the first sidewall includes a guide groove through which the panel FPC is outwardly extended from the lower substrate.

14. The display device of claim 12, wherein the light-providing module comprises:
a light-guide plate disposed in the receiving container such that the light-guide plate faces a lower surface of the lower substrate, the light guide plate including a first side facing the first sidewall;
a point light source disposed between the first side of the light-guide plate and the first sidewall; and
a power printed circuit board ("PCB") on which the point light source is mounted.

15. The display device of claim 14, wherein the supporting portion includes a light source receiving groove where the point light source is disposed.

16. The display device of claim 11, wherein the display panel module further comprises:
a driving PCB driving the display panel; and
an FPC connecting the driving PCB to the display panel.

17. The display device of claim 16, wherein the light-providing module comprises:
a light-guide plate disposed in the receiving container such that the light-guide plate faces a lower surface of the lower substrate;
a lamp disposed between a fourth sidewall of the receiving container and the light-guide plate, the fourth sidewall facing the first sidewall; and
a lamp cover covering the lamp such that light emitted from the lamp enters the light-guide plate through an incident side face of the light-guide plate.

18. The display device of claim 17, further comprising a receptacle including:
a bottom plate on which the light-guide plate is disposed; and
a sidewall portion upwardly extended from the bottom plate and combined with the receiving container.

19. A method of forming a display device, the method comprising:
forming a receiving frame including a first sidewall, second and third sidewalls connected to end portions of the first sidewall and facing each other, and a supporting portion extending from inner surfaces of the first, second and third sidewalls;
forming first buffer recesses in the first and second sidewalls at a region where the first and second sidewalls meet each other, and in the first and third sidewalls where the first and third sidewalls meet each other;
forming second buffer recesses in the supporting portion of the receiving frame, the second buffer recesses being disposed at regions of the supporting portion at which the first and second sidewalls meet each other and the first and third sidewalls meet each other, respectively;
disposing a display panel module including a lower substrate, an upper substrate combined with the lower substrate, and a liquid crystal layer disposed between the lower and upper substrates, in the receiving frame such that corners of the lower substrate are correspondingly disposed facing the first buffer recesses, and the supporting portion supports edge portions of the lower substrate; and
disposing a light-providing module in the receiving container such that the light-providing module is disposed under the display panel module;
wherein the first buffer recesses and second buffer recesses separate side and lower faces of the lower and upper substrates from the receiving frame.

20. The method of claim 19, wherein the receiving frame, the first buffer recesses and the second buffer recesses are simultaneously formed.

* * * * *